(12) United States Patent
Kirjavainen

(10) Patent No.: US 6,585,923 B1
(45) Date of Patent: Jul. 1, 2003

(54) EXTRUSION METHOD AND EXTRUDER

(75) Inventor: Kari Kirjavainen, Tampere (FI)

(73) Assignee: Natural Colour Kari Kirjavainen Oy, Espoo (FI)

( * ) Notice: Subject to any disclaimer, the term of this patent is extended or adjusted under 35 U.S.C. 154(b) by 0 days.

(21) Appl. No.: 09/807,925

(22) PCT Filed: Oct. 21, 1999

(86) PCT No.: PCT/FI99/00874
§ 371 (c)(1),
(2), (4) Date: Apr. 20, 2001

(87) PCT Pub. No.: WO00/23251
PCT Pub. Date: Apr. 27, 2000

(30) Foreign Application Priority Data

Oct. 21, 1998 (FI) .................................................. 982272

(51) Int. Cl.$^7$ .......................... B29C 47/06; B29C 47/24; B29C 47/28; B29C 47/42
(52) U.S. Cl. ............................ 264/171.13; 264/173.16; 264/209.2; 264/209.3; 264/211.23; 366/83; 425/113; 425/114; 425/133.1; 425/204; 425/380; 425/381; 425/382.3; 425/462
(58) Field of Search ..................... 264/171.13, 173.16, 264/209.2, 209.3, 211.23; 425/113, 114, 133.1, 204, 380, 381, 382.3, 462; 366/83, 84, 85, 86

(56) References Cited

U.S. PATENT DOCUMENTS

| 2,563,396 | A | * | 8/1951 | Colombo | 425/204 |
| 2,785,438 | A | * | 3/1957 | Willert | 425/382.3 |
| 2,942,294 | A | * | 6/1960 | Reifenhauser | 425/204 |
| 3,664,790 | A | | 5/1972 | Hollander | |
| 3,929,322 | A | * | 12/1975 | Hanslik | 366/85 |
| 4,057,376 | A | * | 11/1977 | Berger | 425/204 |
| 4,591,487 | A | * | 5/1986 | Fritsch | 425/204 |
| 5,393,140 | A | * | 2/1995 | Blach | 425/204 |
| 5,429,435 | A | * | 7/1995 | Blach | 425/204 |
| 5,695,789 | A | | 12/1997 | Harris | 425/131.1 |
| 6,190,031 | B1 | * | 2/2001 | Blach et al. | 366/85 |
| 6,196,711 | B1 | * | 3/2001 | Blach et al. | 366/83 |

FOREIGN PATENT DOCUMENTS

WO         96/33855        10/1996

* cited by examiner

Primary Examiner—James P. Mackey
Assistant Examiner—Joseph Leyson
(74) Attorney, Agent, or Firm—Young & Thompson

(57) ABSTRACT

An extrusion method and an extruder, the material to be extruded being fed with a material feeding device (1) into a radial pump unit included in the equipment. The radial pump unit comprises conical gearwheels (2) which are adjacently positioned and rotate in opposite directions. The radial pump unit transfers the material in an annular flow into the extruder's nozzle (4). Additional material (20) can be supplied into the product through the radial pump unit.

37 Claims, 7 Drawing Sheets

EXTRUSION METHOD AND EXTRUDER

BACKGROUND OF THE INVENTION

The invention relates to an extrusion method where at least one material feeding device is used to feed material through a gearwheel unit into a nozzle.

The invention further relates to an extruder comprising at least one material feeding device, gearwheel unit and nozzle arranged after the gearwheel unit, the material feeding device being arranged to feed the material through the gearwheel unit into the nozzle.

The invention also relates to a product produced with the method.

An extruder typically comprises a cylindrical stator provided with a long cylindrical rotor arranged inside the stator. A problem arises from how to achieve a uniform extruder yield and how to ensure the centricity and uniform radial thickness of the extruded product. To ensure the centricity of the product, the far end of the extruder usually has to be provided with a spider leg which causes weld lines in the product.

Prior art also knows a solution where the extruder comprises a conical rotor and a conical stator. This allows a the extruder to be made relatively short, and the spider leg is not needed. An example of this solution is described in WO Patent Application 97/37832. The publication also teaches that the equipment comprises separately adjustable feeding devices for regulating the material flows to be fed to supply conduits arranged on different sides of the rotor. By adjusting the feeding devices and the speed of rotation of the rotor, the properties of the different layers in the extruded product are regulated. The solution in question allows a most versatile control of the product properties, but it requires skill and expertise from the user.

U.S. Pat. No. 5,695,789 discloses an equipment comprising at least two extruders and a gear pump arranged after each extruder, the gear pumps being used for feeding the material to be extruded into a nozzle. Each gear pump supplies material for a different product layer, the equipment thus producing a multilayer product. To control the thickness of the different layers, each gear pump is separately adjusted, in other words, the yield of each layer is controlled by adjusting the gear pump. The equipment is most complex, and the centricity and uniform radial thickness of the product cannot be sufficiently well ensured. In multilayer products in particular it is most difficult to achieve a good thickness profile in the separate layers and in the end product.

SUMMARY OF THE INVENTION

An object of the present invention is to provide a method and equipment allowing a product with a good centricity and thickness profile to be produced.

The method of the invention is characterized in that the gearwheel unit is a radial pump unit comprising conical gearwheels which are adjacently positioned and rotate in opposite directions, the radial pump unit transferring an annular flow of material into the extruder's nozzle.

Further, an extruder of the invention is characterized in that the gearwheel unit is a radial pump unit comprising conical gearwheels which are adjacently positioned and rotate in opposite directions, the radial pump unit being arranged to transfer an annular flow of material into the extruder's nozzle.

A product of the invention, in turn, is characterized in that the product comprises a basic material and an additional material supplied through the radial pump unit.

An essential idea of the invention is that the material feeding device supplies the material to be extruded in a melted form into the radial pump unit of the equipment, the radial pump unit comprising a plural number of conical gearwheels which are adjacently positioned and provided with helical gears, or a plural number of screws which are adjacently positioned and rotate in opposite directions. The radial pump unit transfers the material in an annular flow into the extruder's nozzle. A preferred embodiment is based on the idea that at least one gearwheel in the radial pump unit receives its rotational energy via the material feeding device. The idea of a second preferred embodiment is that the material feeding device is a melting screw. A third preferred embodiment is based on the idea that a continuous solid material, a liquid or gas, or a combination of these, is supplied through the gearwheel. A fourth preferred embodiment is based on the idea that there is a plural number of material feeding devices and that the material to be extruded is supplied into the material feeding devices through a ring channel where their input ends are connected to. A fifth preferred embodiment is based on the idea that the equipment is provided with a plural number of radial pump units, which allows a plural number of material layers arranged one inside the other to be supplied into the extruder's nozzle to produce multilayer products.

An advantage of the invention is that an extremely uniform yield is obtained using the equipment. In addition, it provides a simple means for ensuring an excellent centricity of the product, thereby allowing products with extremely good centricity and radial thickness profile to be produced. Furthermore, an excellent thickness profile is achieved in multilayer products. The solution of the invention further allows the material or materials to be extruded to be most effectively melted and mixed, a most homogeneous material flow being thereby obtained. Further still, products produced by applying the solution of the invention can be reinforced in various different ways.

BRIEF DESCRIPTION OF THE DRAWINGS

The invention will be described in greater detail with reference to the accompanying drawings, in which.

DESCRIPTION OF THE PREFERRED EMBODIMENTS

Figure 1:
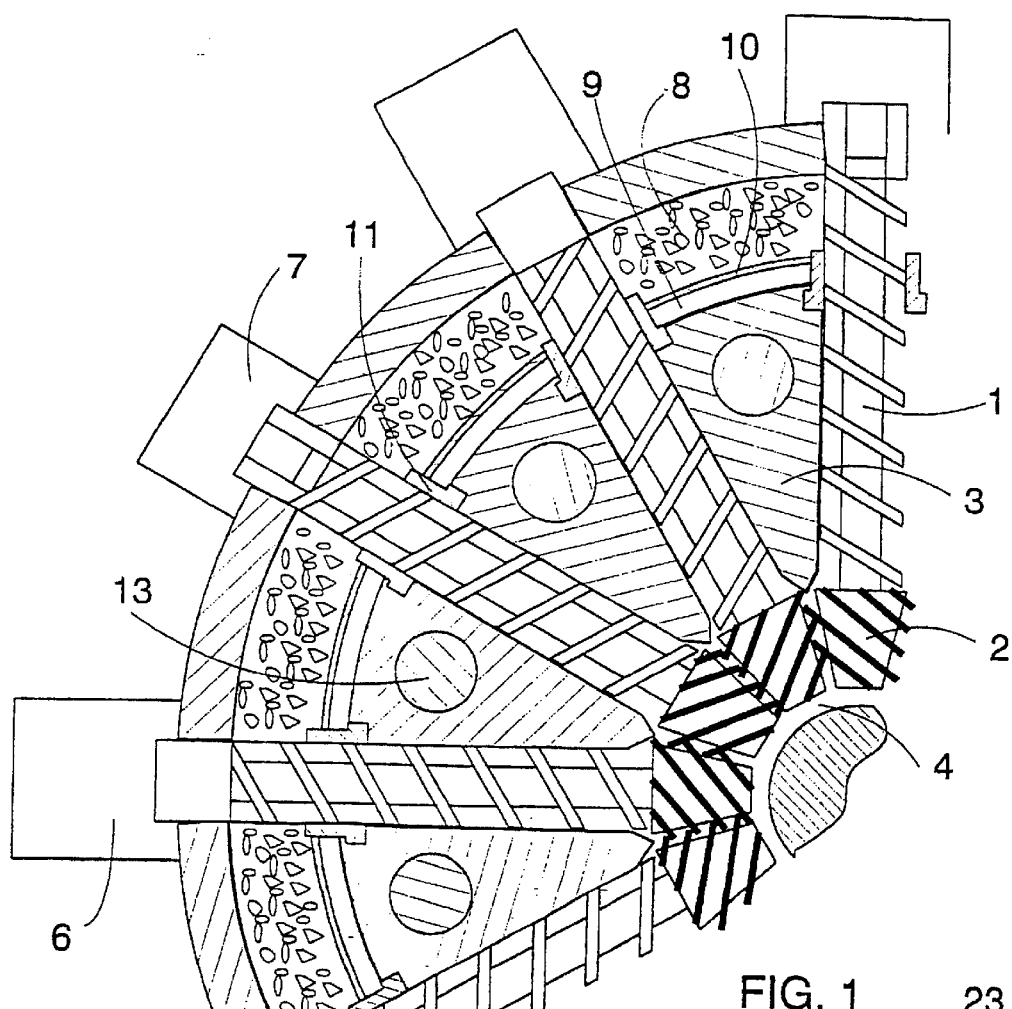
FIG. 1 shows a schematic, cross-sectional front view of a part of an extruder of the invention.
Figure 7:
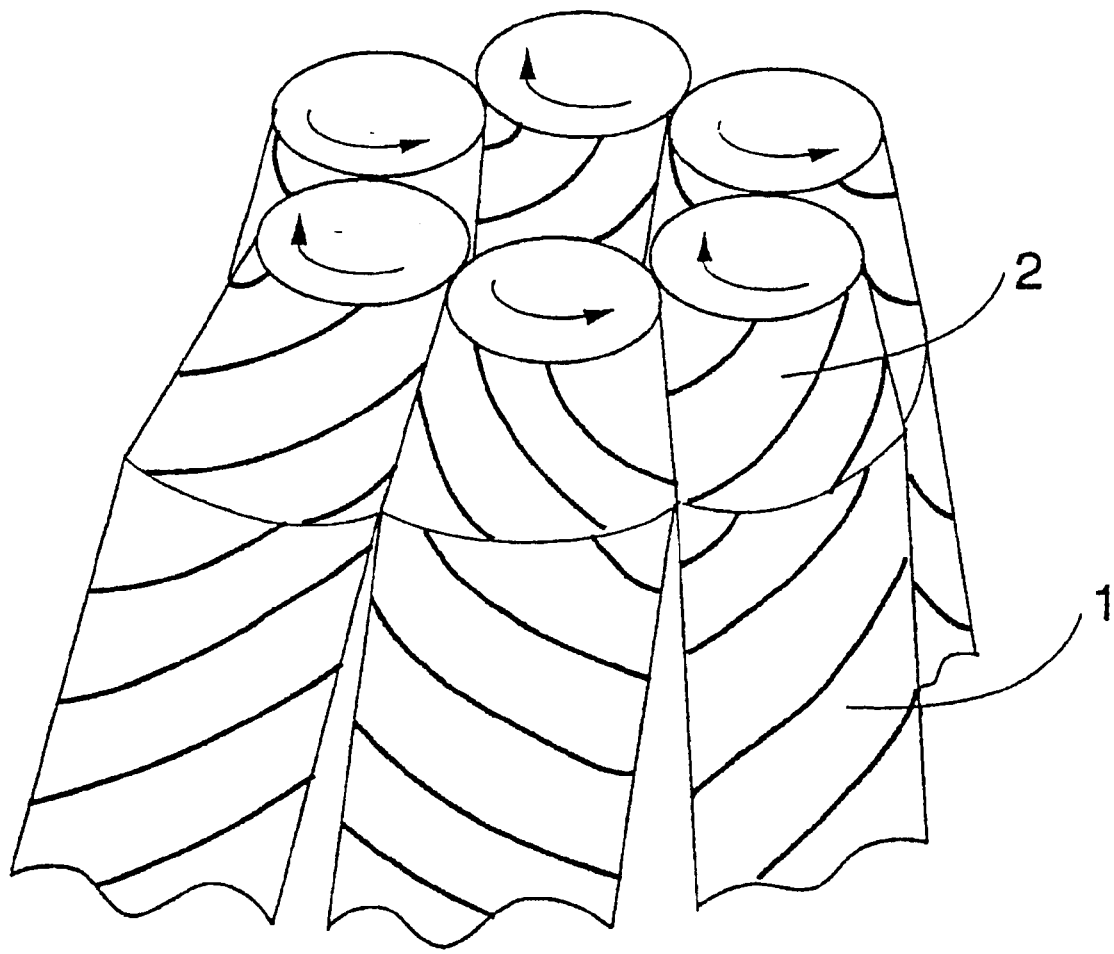
FIG. 7 shows a schematic view of a part of a fourth extruder of the invention seen diagonally from above.

FIG. 1 illustrates a part of an extruder in a cross-sectional front view. The cross-sectional surface is substantially circular, but for the sake of clarity the Figure only shows a part of the extruder. The extruder comprises a plural number of material feeding devices 1, represented by melting screws in the preferred embodiment illustrated in FIG. 1. The material feeding device 1 is used for feeding the material to be extruded, such as plastic, to conical gearwheels 2 that form a radial gear pump. The conical gearwheels 2 can be conical cogwheels with helical gearing, for example, as shown in FIG. 1, or they can be screws which are adjacently positioned and rotate in opposite directions, as shown in FIG. 7. The material feeding devices 1 are located between frame parts 3. The division surface of the frame parts 3 is preferably horizontally located, substantially at the centre axis of the material feeding devices 1, as illustrated with a lineof dots and dashes A in FIG. 2.

Figure 2:
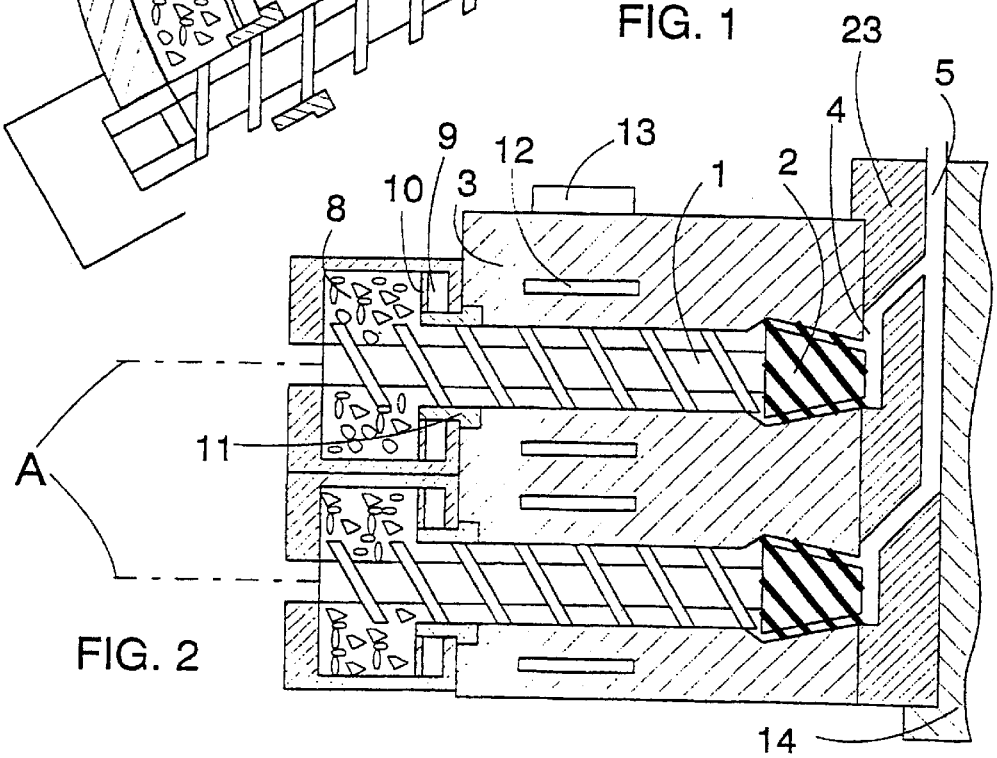
FIG. 2 shows a cross-sectional side view of an equipment according to FIG. 1.

The radial pump unit feeds plastic also radially at a constant rate into the nozzle 4. When a plural number of radial pump units is used, for example as shown in FIG. 2, each radial pump unit feeds material into the nozzle 4 from where the material flows further into the connecting conduit 5 for forming the product. This enables multilayer products to be produced if needed.

The material feeding devices 1 can be rotated for example with geared motors 6. The motors 6 can be synchronized to an equal speed for example by parallel coupling of squirrel-cage induction motors and by controlling them with a common inverter. The radial pump unit naturally performs the final synchronization of the speeds to make them equal. Since in multilayer applications in particular it is difficult to arrange a large number of motors 6 on the circumference of the extruder, it is preferred to leave out every second motor 6, for example. Instead of the motor 6, a thrust bearing 7 is in this case arranged at the end. of the material feeding device 1, on the circumference of the extruder.

The material to be extruded is fed into the material feeding device 1 using a ring channel 8. The material is sucked into the ring channel 8 with an annular suction conduit 9. Between the angular suction conduit 9 and the ring channel 8 is arranged a suction filter 10. The material is supplied from the ring channel 8 into the material feeding devices 1 by means of feeding sleeves 11. The entrance bushings 11 are preferably provided with spiral grooves that are opposite in direction to the screw threads of the material feeding devices 1. In the material feeding devices 1, the material melts. To melt the material more efficiently, the material feeding devices 1 may also include compression. When melting screws are used, the screw ridges may be provided with points for the overflow of the material to enhance the shear. Further, the frame parts 3 can be provided with heating resistors 12 which are used for ensuring and controlling the melting of the material. The frame parts 3 are attached together for example with fixing screws 13.

The material to be extruded can be mixed with another material, such as calcium carbonate, the extruder then acting as a compounder. Since the extruder melts and mixes the material most effectively, the extruder functioning as a compounder need not produce an intermediate product, such as an intermediate granulate, but the extruder of the invention can directly produce the end product, i.e. it functions as a so-called on-line compounder.

The extruder is provided with a mandrel 14 in the centre. The mandrel 14 is preferably arranged to be rotated. The rotatable mandrel 14 can be used to produce a helical orientation in the product to be produced. A sleeve 23 outside the nozzle 4 and the connecting conduit 5 can also be arranged to be rotated. The rotatable sleeve 23 can then be also used for producing the helical orientation in the product.

Figure 3:
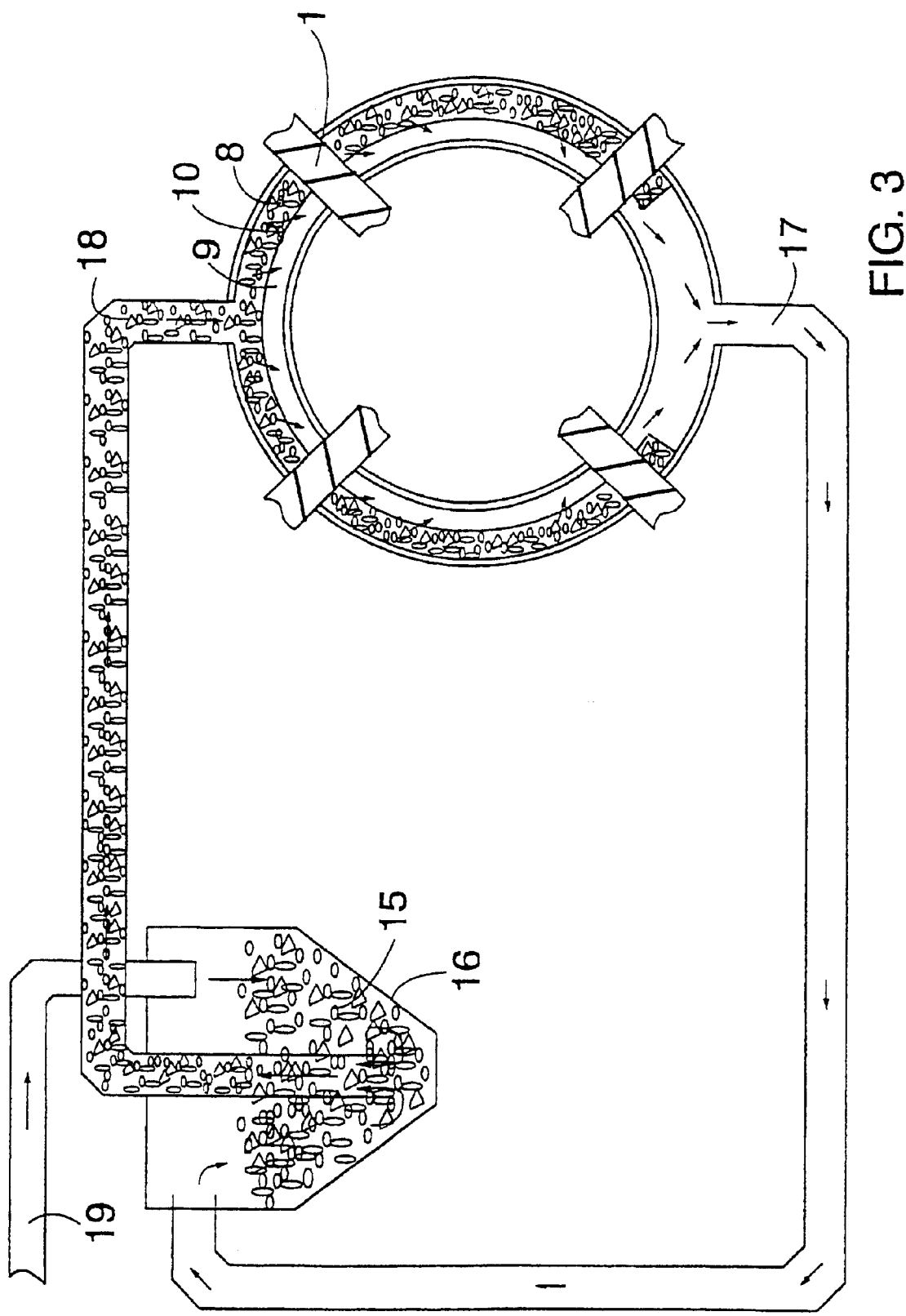
FIG. 3 shows a schematic view of a material feeding solution for the equipment of FIG. 1.

FIG. 3 is a schematic view of a solution for supplying material 15 to be extruded into the material feeding device 1. The material 15 to be extruded can be for example plastic in powder, granulate or other suitable form. The material 15 is supplied from a supply container 16. The equipment comprises a suction pipe 17 for sucking air, the material 15 thereby flowing via a supply pipe 18 into the ring channel 8. The air in the material 15 flows through the suction filter 10 into the annular suction conduit 9 and further into the suction pipe 17. The suction filters 10 can be cleaned for example by momentarily reversing the direction of rotation of the air. Instead of air, the system can employ a suitable protective gas or a gas mixture. Heat generated in the extruder and mixed with air or gas can be transferred via the suction pipe 17 into the material 15 in the supply container 16 to heat the material 15. More material 15 can be sucked into the supply container 16 along a filling pipe 19.

Figure 4:
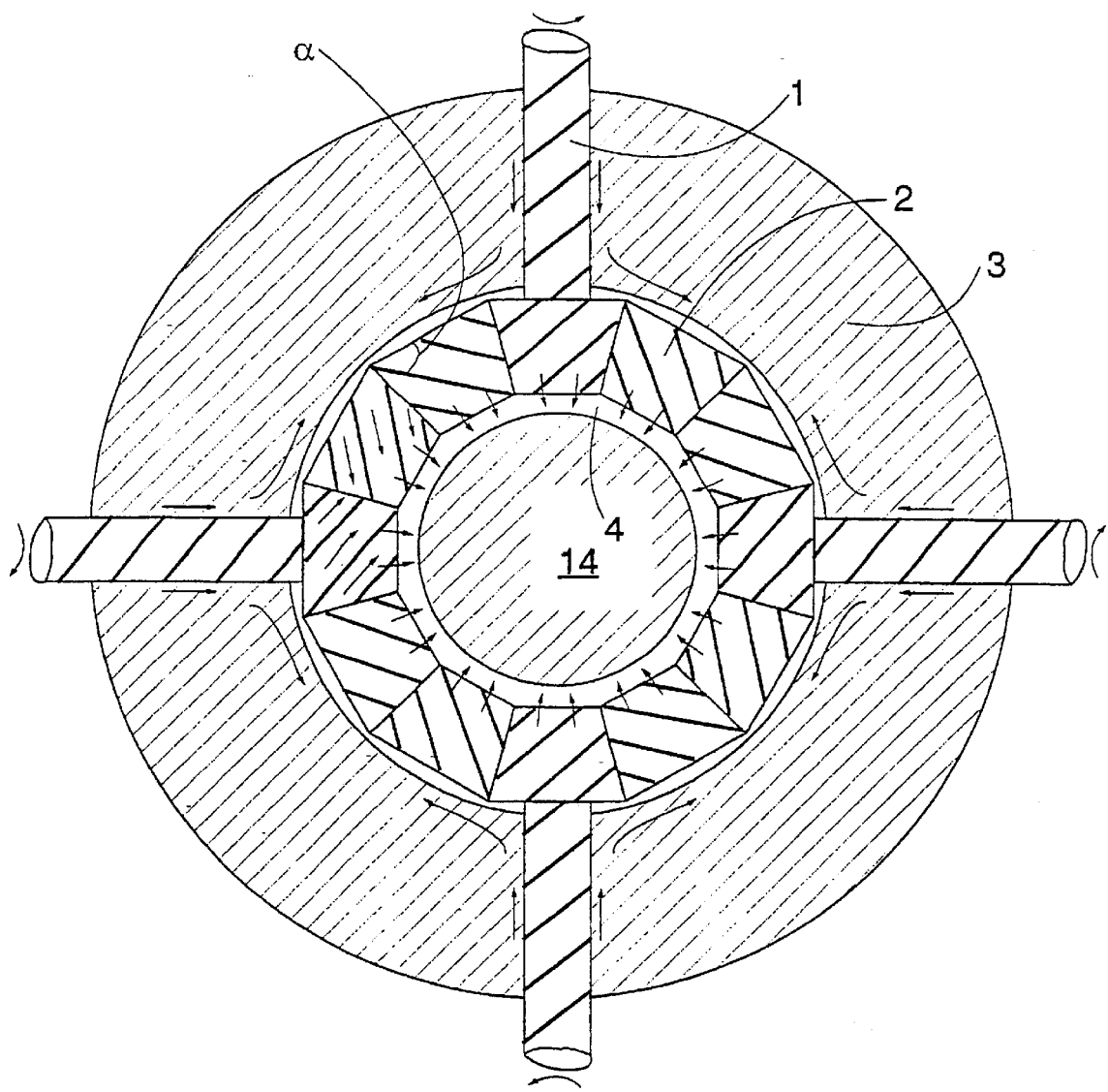
FIG. 4 shows a schematic, cross-sectional front view of a part of a second extruder of the invention.

FIG. 4 is a schematic view of an arrangement where four material feeding devices 1 feed the radial pump unit, some of the conical gearwheels of which are rotated by other gearwheels 2 coupled to the material feeding devices 1. A curved arrow at the end of each material feeding device 1 illustrates the direction of rotation of the material feeding device. The other arrows illustrate the flow of the material in the equipment. It is to be noted that the flow caused by the material feeding devices 1 also rotates the conical gearwheels 2, which do not necessarily need to be coupled to the material feeding devices 1 at all. unless the yield of the equipment is to be connected to the speed of rotation of the motors rotating the material feeding device 1. The speed of rotation of the conical gearwheels 2 is, however, most preferably adjustably arranged, and the tooth pitch angle $\alpha$ of the gearwheel 2 is arranged to be so small that the groove between the teeth does not form an open path for the material. If the angle $\alpha$ is too big, the material can flow over the gearwheel 2, the yield of the extruder being then determined by the yield of the material feeding device 1. If the angle $\alpha$ is sufficiently small, the speed of rotation of the gear pump formed by the conical gearwheels 2 determines the amount of yield coming out. In this case the radial pump unit functions as a constant flow pump. The angle $\alpha$ is preferably so small that a tooth extends more than halfway round the gearwheel 2.

Figure 5:
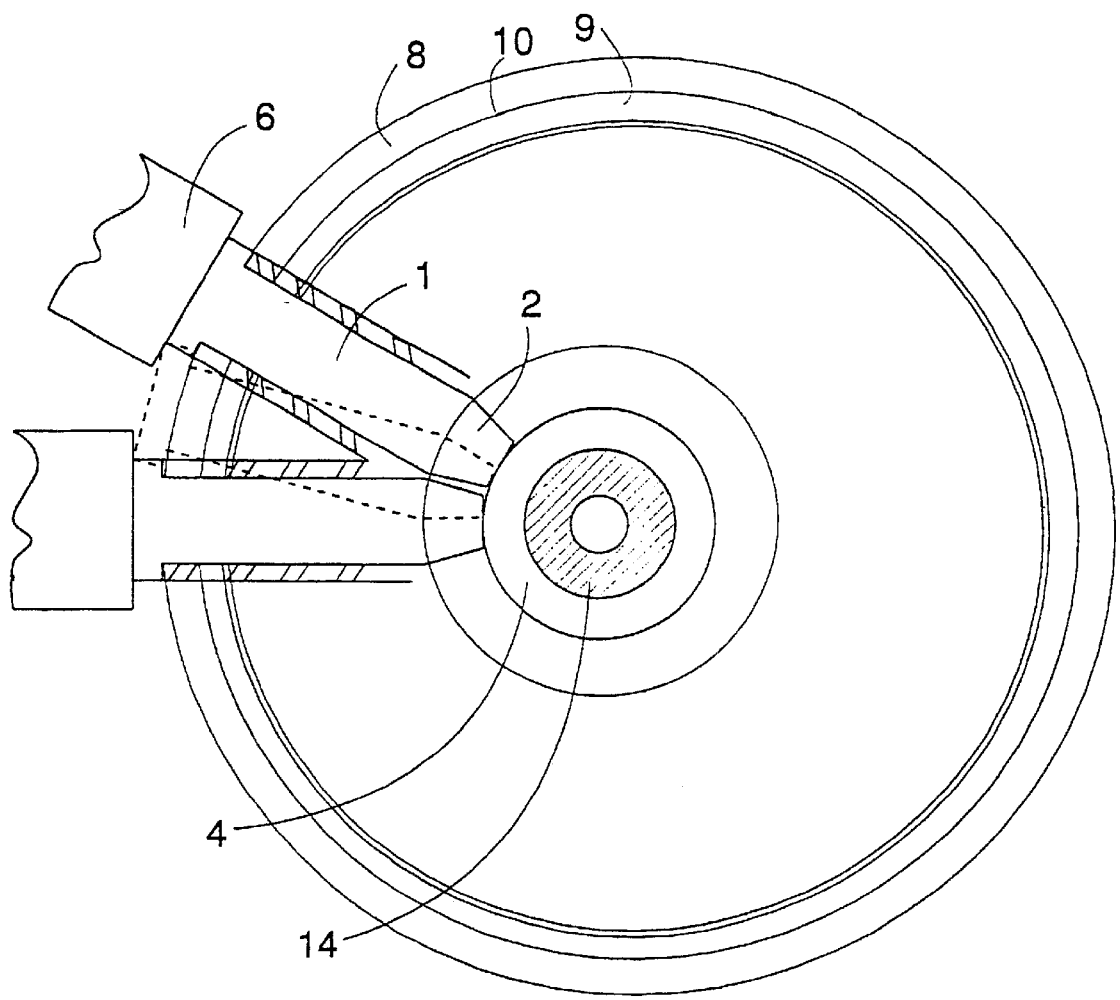
FIG. 5 shows a schematic front view of a third extruder of the invention.
Figure 6:
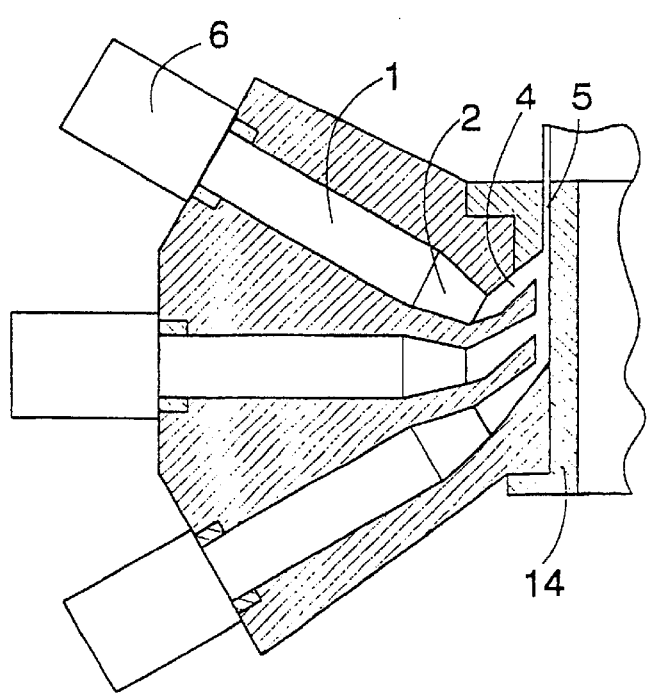
FIG. 6 shows a cross-sectional side view of the extruder of FIG. 5.

FIGS. 5 and 6 schematically illustrate a solution where the material feeding devices 1 in the top and bottom layers are arranged in a conical form so as to better accommodate the geared motors 6 on the circumference of the equipment. For the sake of clarity, FIG. 5 only shows two material feeding devices 1, two conical gearwheels 2 and two stepped motors 6, although they are naturally arranged round the entire equipment. In addition, the position of the material feeding devices 1 and the radial pump unit in layers that come one on top of the other is staggered in such a way that the central axis of the conical gearwheels 2 in successive layers is aligned with the contacting surfaces of the gearwheels 2 in the previous layer, or substantially close to the contacting surfaces. Broken lines show the material feeding device 1 and the gearwheel 2 located in the layer below the cross-sectional surface shown in FIG. 5. Furthermore, the material feeding device 1 and the conical gearwheel 2 are arranged as a single entity. This entity thus comprises a substantially cylindrical part tapering towards the top. This allows the material feeding devices 1 and the conical gearwheels 2 at their top to be removed from the equipment by pulling them out backwards, together with the geared motors 6, for example. This way the frame part 3 does not necessarily have to be provided with any division surfaces.

The different layers of a multilayer extruder can be provided with a varying number of material feeding devices 1. In multilayer products that include layers of glue, the thickness of the glue layers is typically about 1% of the total thickness of the product. When such products are manufactured, fewer material feeding devices 1 are therefore preferably used in these layers.

FIG. 7 schematically illustrates a solution where the material feeding devices 1 and the conical gearwheels 2 are arranged in a tapering conical form. This allows a compact extruder structure to be obtained. In the embodiment shown in FIG. 7, the material feeding device 1 is a conventional extrusion screw with a conically tapering tip, the tip portion thus forming the conical gearwheel 2. The radial pump unit formed by the conical gearwheels 2 functions as a single entity and produces one radially symmetrical outward flow. Material comes out from every groove in each gearwheel 2.

Figure 8A:
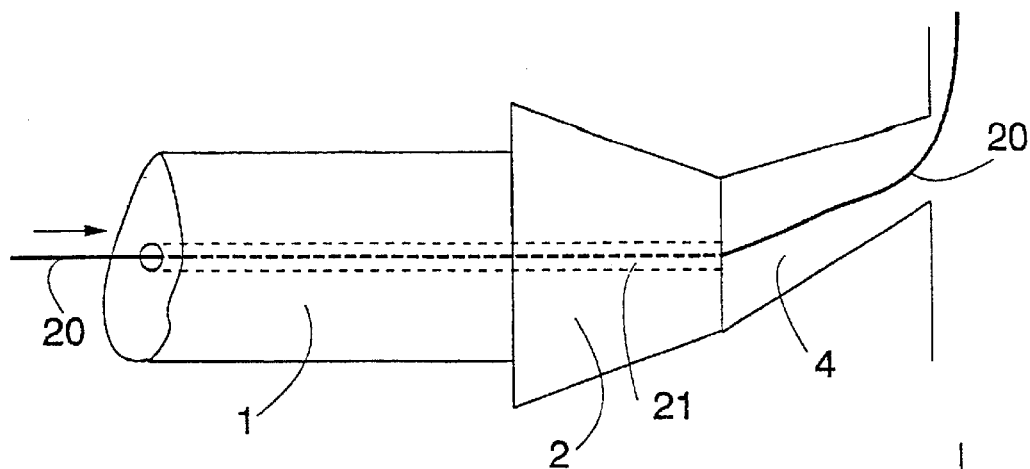
FIGS. 8a to 8c are schematic illustrations of a part of a fifth extruder of the invention.
Figure 8B:
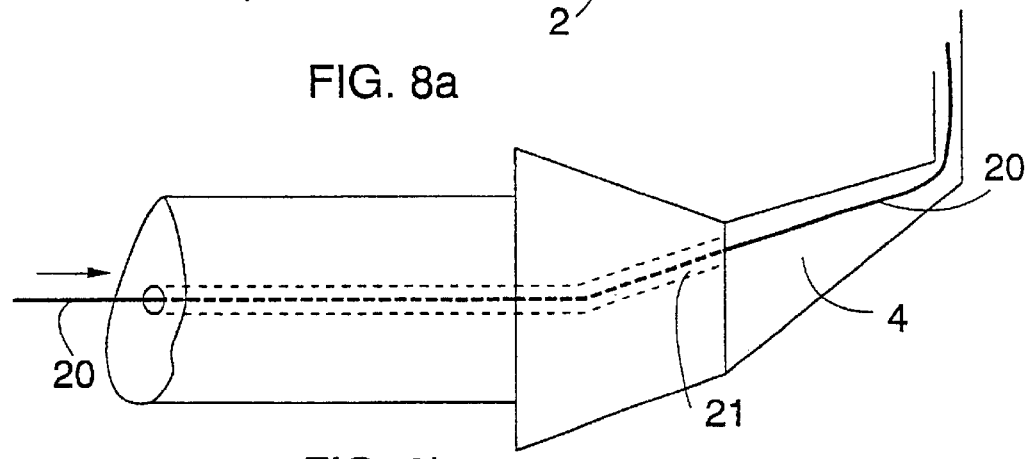
Figure 8C:
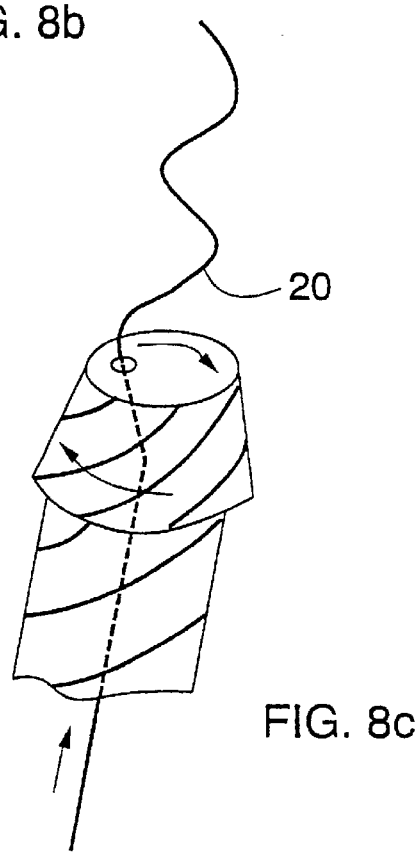

FIGS. 8a to 8c schematically illustrate embodiments in which additional material 20 is fed through the material feeding devices 1 and the conical gearwheels 2. For feeding the additional material 20, the material feeding device 1 and the gearwheel 2 are provided with openings 21. The additional material 20 can consist of a continuous material, fluid or gases, or combinations of these. The material 20 to be supplied can be, for example, a continuous reinforcement material, such as glass fibre cord, which can be fed through all material feeding devices 1 and conical gearwheels 2 included in the equipment to reinforce the product. The additional material 20 can also be an electric wire or an optical fibre. Further, the additional material can be plastic or a mixture of plastic that orientates in a melted form, or the material can be a cross-linked polyethylene, for example.

FIG. 8b shows a structure where the outlet end of the opening 21 going through the conical gearwheel 2 is non-centrally arranged. This causes wave-like variation in the position of the additional material 20 in the product, as shown in FIG. 8c. Due to the transverse movement, the basic product material 15 can thus enter between fibres fed in bundles, for example. Some of the gearwheels 2 in one and the same radial pump unit can be provided with a centrally arranged outlet and otherswith a non-central one.

Figure 9A:
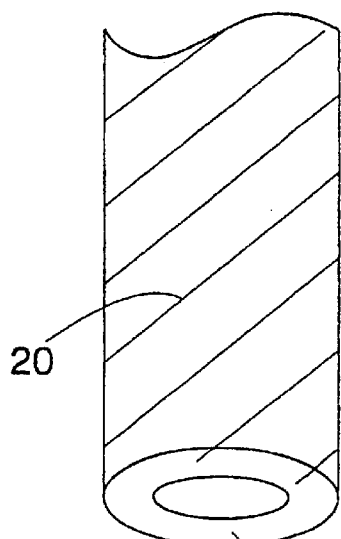
FIGS. 9a to 9g are schematic illustrations of structures of products produced with solutions of the invention.
Figure 9B:
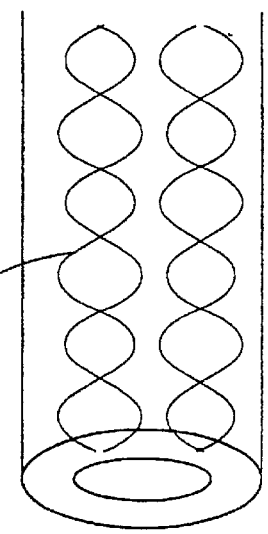
Figure 9C:
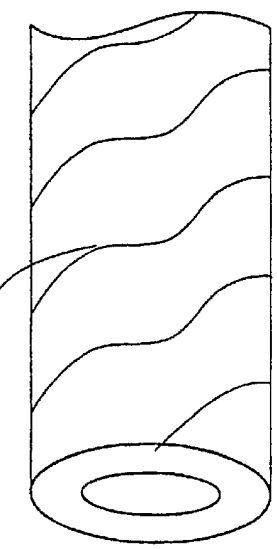

FIG. 9a is a schematic view of a product in which additional material 20 is supplied into the product material 15, the additional material being helically orientated in the product by rotating the extruder's mandrel 14, sleeve 23, or both. In FIG. 9b, the additional material 20 is arranged in the product in a wave-like manner by applying the solution of FIG. 8c. In FIG. 9c, the additional material 20 is arranged in the product in a wave-like and helical manner by applying the solution of FIG. 8c and by simultaneously rotating the mandrel 14. The solution of FIG. 9c is most suitable for example for cable products where the additional material 20 is an optical fibre. An optical fibre does not break even though the cable has to be bent.

Figure 9D:
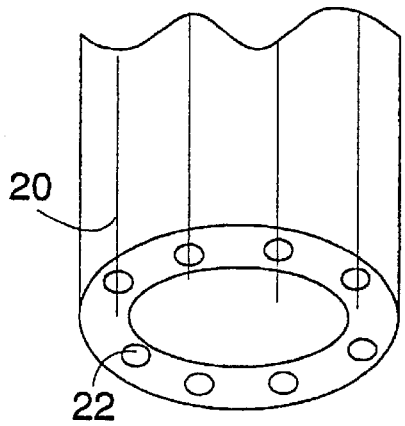
Figure 9E:
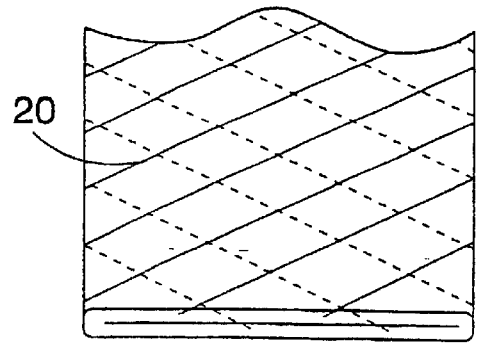

FIG. 9d shows a solution where the additional material 20 is arranged in the axial direction of the product. The product further comprises axial air ducts 22. The air ducts 22 are formed for example by supplying air together with the additional material 2, such as an optical fibre, into the product. When the optical fibre, for example, in the product is inside the air duct 22, the product can be bent to a considerable extent without the optical fibre being damaged. FIG. 9e shows a solution where the additional material 20 is helically arranged in the product and the product is then flattened, the additional material thus being criss-cross in the end product.

Figure 9F:
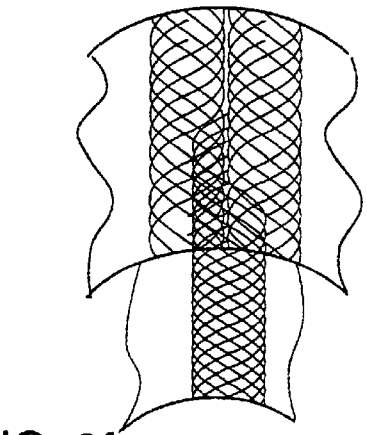

FIG. 9f schematically illustrates a multilayer product where the additional materials are interleaved in the different layers. In each layer, the orientation field thus provided can be achieved for example by using plastics or plastic mixtures. An orientation field such as this is formed when the plastic exits the radial pump unit, and the flows are flattened in the nozzles. To obtain the best reinforcement, at least two extrusion layers are needed, the positioning of the melting screws in the layers being suitably staggered.

Figure 9G:
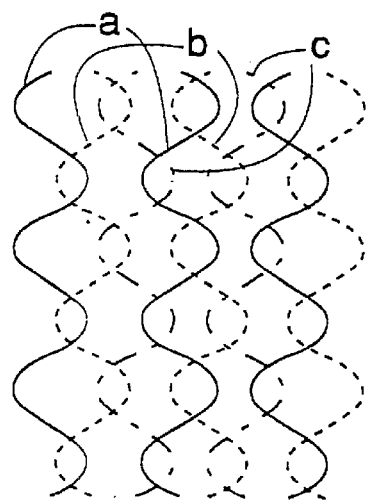

FIG. 9g illustrates a product provided with a netlike reinforcement structure achieved by means of three separate extrusion layers. A continuous line a shows the additional materials in the first layer, a broken line b the additional materials in the second layer, and a line of dots and dashes c the additional materials in the third layer. This allows a netlike reinforcement structure to be accomplished in the product. The correct phasing of the reinforcements can be obtained by rotating the material feeding devices and the gearwheels in the successive layers by means of a common gear system.

The drawings and the related description are only intended to illustrate the inventive idea. The details of the invention may vary within the scope of the claims. Therefore the product may be for example a cable, pipe, film, blow-moulded product, profile, injection-moulded product, or any other similar product.

What is claimed is:

1. An extrusion method comprising the steps of:
   feeding material from a material feeding device through a gearwheel unit, where the gearwheel unit is a radial pump unit with conical gearwheels which are adjacently positioned and rotate in opposite directions; and
   transferring an annular flow of the material from the radial pump unit into a nozzle.

2. The method according to claim 1, wherein at least one of the gearwheels of the radial pump unit is rotated by the material feeding device.

3. The method according to claim 1, wherein the material feeding device is a melting screw that melts the material to be extruded.

4. The method according to claim 1, wherein additional material is supplied through the radial pump unit.

5. The method according to claim 1, wherein there are at least two of the material feeding device.

6. The method according to claim 5, wherein the material to be extruded is supplied to the material feeding devices through a ring channel connecting input ends of the material feeding devices.

7. The method according to claim 6, wherein the material is sucked into the ring channel by using air or gas.

8. The method according to claim 7, wherein, together with the sucked air or gas, heat is supplied from an extruder into the supplied material.

9. The method according to claim 1, including an extruder which comprises a mandrel which is rotated during the extrusion.

10. The method according to claim 1, wherein at least one of the conical gearwheels is provided with an opening through which additional material is supplied, the opening being non-centrally arranged to the one gearwheel.

11. The method according to claim 1, wherein at least one of the conical gearwheels is provided with an opening through which additional material is supplied, the opening being centrally arranged to the one gearwheel.

12. The method according to claim 1, wherein an extruded product is flattened.

13. The method according to claim 1, wherein a tooth pitch angle a of the gearwheels is so small that the radial pump unit functions as a constant flow pump, the speed of rotation of the radial pump unit determining the amount of the output yield.

14. The method according to claim 1, wherein a plural number of the radial pump unit and the nozzle are provided, the nozzles arranged after the radial pump units being connected to a connecting conduit in such a way that multilayer products are produced.

15. The method according to claim 14, wherein the gearwheels of at least two different radial pump units are interleaved.

16. The method according to claim 1, wherein the material feeding device and the gearwheels are arranged to be removed backwards from a housing, without otherwise substantially disassembling the housing.

17. The method according to claim 1, wherein a plural number of the material feeding device are provided, and the material feeding devices and the radial pump unit are arranged in a tapering conical form.

18. The method according to claim 1, wherein a basic material and another material are supplied into an extruder, the extruder functioning as an on-line compounder producing a product from the materials.

19. A method according to claim 1, wherein a sleeve is outside the nozzle, the sleeve being rotated during extrusion.

20. An extruder comprising:
at least one material feeding device;
a gearwheel unit and
a nozzle arranged after the gearwheel unit,
the material feeding device being arranged to feed a material through the gearwheel unit into the nozzle,
the gearwheel unit being a radial pump unit comprising conical gearwheels arranged to be adjacently positioned and to rotate in opposite directions and the radial pump unit being arranged to transfer an annular flow of the material into the nozzle.

21. The extruder according to claim 20, where at least one of the gearwheels in the radial pump unit is arranged to be rotated by the material feeding device.

22. The extruder according to claim 20, the extruder further comprises at least one motor which is arranged to rotate the material feeding device.

23. The extruder according to claim 20, wherein the material feeding device is a melting screw which is arranged to melt the material to be extruded.

24. The extruder according to claim 20, wherein at least one of the gearwheels is provided with an opening, additional material being arranged to be fed through the opening.

25. The extruder according to claim 24, the opening is non-centrally arranged to the one gearwheel.

26. The extruder according to claim 24, wherein the opening is centrally arranged to the one gearwheel.

27. The extruder according to claim 20, wherein the extruder comprises at least two of the material feeding devices.

28. The extruder according to claim 27, wherein the extruder further comprises a ring channel which is arranged to connect input ends of the material feeding devices in such a way that the material to be extruded is arranged to be supplied into the material feeding devices through the ring channel.

29. The extruder according to claim 28, wherein the extruder further comprises a suction conduit, the material to be extruded being arranged to be sucked into the ring channel by the suction conduit.

30. The extruder according to claim 29, wherein the extruder further comprises means for transferring heat that is in the extruder into the material to be supplied into the extruder.

31. The extruder according to claim 20, wherein the extruder further comprises a mandrel which is arranged to be rotated.

32. The extruder according to claim 20, wherein a tooth pitch angle a of the gearwheels is arranged to be so small that the radial pump unit functions as a constant flow pump, the speed of rotation of the radial pump unit determining the amount of output yield.

33. The extruder according to claim 20, wherein the extruder comprises a plural number of the radial pump units, the extruder being arranged to produce multilayer products.

34. The extruder according to claim 33, wherein seen from a front, the gearwheels of at least two separate radial pump units are interleaved.

35. The extruder according to claim 20, wherein the material feeding device and the gearwheels are arranged to be removed backwards from a housing of the extruder, without otherwise substantially disassembling the housing.

36. The extruder according to claim 20, wherein there are a plural number of the at least one material feeding device, and the material feeding devices and the radial pump unit have a tapering conical form.

37. The extruder according to claim 20, wherein the extruder further comprises a sleeve arranged outside the nozzle, the sleeve being arranged to be rotated.

* * * * *